(12) United States Patent
Niitsuma

(10) Patent No.: US 6,223,009 B1
(45) Date of Patent: Apr. 24, 2001

(54) IMAGING FORMING APPARATUS WITH A PRIORITY ORDER DETERMINING DEVICE FOR A PLURALITY OF JOBS

(75) Inventor: Tetsuya Niitsuma, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/551,453

(22) Filed: Apr. 18, 2000

(30) Foreign Application Priority Data

Apr. 21, 1999 (JP) .................................................. 11-113811

(51) Int. Cl.[7] .................................................. G03G 15/00
(52) U.S. Cl. .................................................. 399/82; 399/84
(58) Field of Search .................................. 399/82, 85, 87, 399/83, 84, 75; 358/296, 300

(56) References Cited

U.S. PATENT DOCUMENTS

| | | | | |
|---|---|---|---|---|
| 4,956,667 | * | 9/1990 | Gartner | 399/87 X |
| 5,235,396 | * | 8/1993 | Ito et al. | 399/84 |
| 6,137,588 | * | 10/2000 | Deen et al. | 399/85 X |

* cited by examiner

Primary Examiner—Susan S. Y. Lee
(74) Attorney, Agent, or Firm—Jordan B. Bierman; Bierman, Muserlian and Lucas

(57) ABSTRACT

An image forming apparatus has therein an input device for inputting plural jobs relating to image forming, a specifying device which specifies degree of urgency relating to at least a part of the inputted job, a priority order determining device which determines the priority order of the inputted job based on the specified degree of urgency, and an execution device which executes the inputted job, based on the determined priority order.

9 Claims, 2 Drawing Sheets

FIG. 1
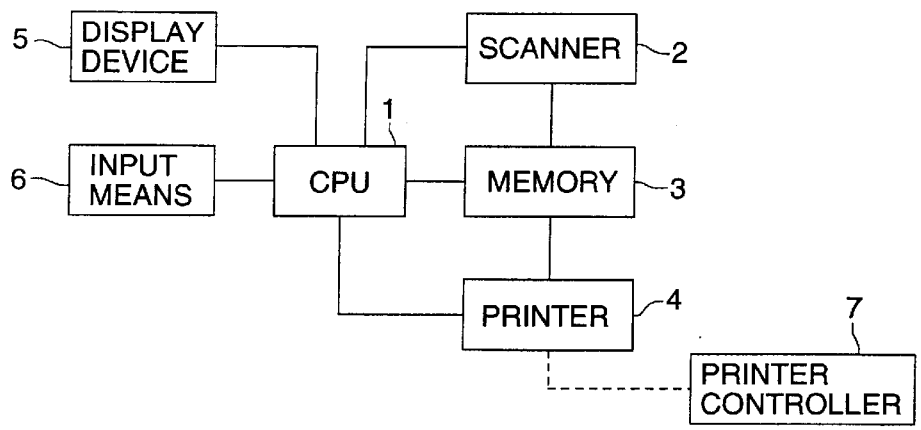
FIG. 2 (a)
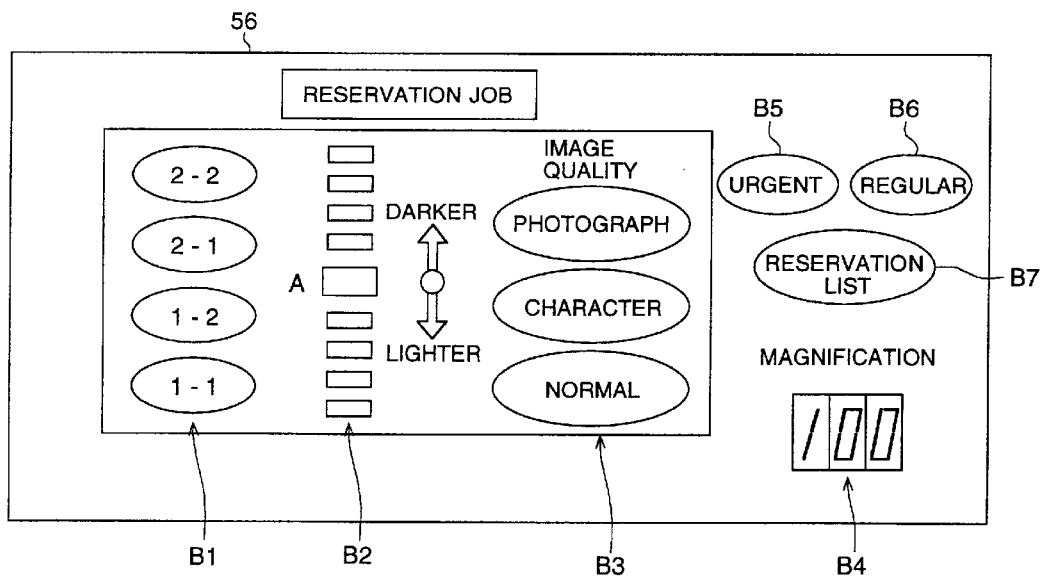
FIG. 2 (b)
| JOB NUMBER | STATE | PRIORITY | REMAINING Q'TY OF SHEETS |
|---|---|---|---|
| 2 | RUN | URGENT | 20 |
| 6 | WAIT | URGENT | 6 |
| 3 | WAIT | REGULAR | 5 |
| 5 | WAIT | REGULAR | 8 |
| 4 | WAIT | REGULAR | 10 |

IMAGING FORMING APPARATUS WITH A PRIORITY ORDER DETERMINING DEVICE FOR A PLURALITY OF JOBS

BACKGROUND OF THE INVENTION

The present invention relates to a technology which can determine the order of execution for jobs in an image forming apparatus such as, for example, a copying machine and a printer.

There has been developed a digital copying machine which reads a document to store it as image data, and can make hard copies based on the image data. In the so-called multi-job copying machine which is one type of the digital copying machine stated above, plural documents are read at a time, then, they are recognized as hard copy jobs for each document, and hard copies are made in accordance with the order of execution.

Incidentally, one of merits of the multi-job copying machine is a point that a user can change the order of execution for jobs freely. For example, in a multi-job copying machine, hard copies are made usually in the order of reading documents. However, when there is a job which requires a hard copy urgently, a user can operate a reservation list of jobs so that the job requiring a hard copy urgently may be moved to the forefront of the reservation list. By doing the operation of this kind, it is possible to execute the specific job only on priority basis.

However, operations of the reservation list have the following problems. A multi-job copying machine is usually used by plural users, and each user does not know the degree of urgency for hard copies desired by other users in many cases. Therefore, there is a fear that a job whose degree of urgency is higher is put off when a certain user gives a priority to his job through operations of the reservation list.

Further, since procedures of the operations of the reservation list are complicated, operations require a certain level of experience. A user who is inexperienced in the operations, therefore, needs to be told by other users who are skilled in the operations about procedures to give priority to the job. However, in many cases, execution of the job is undesirably finished while the operations for the job are told, and the operation procedures told are sometimes forgotten before they become necessary again next time.

Further, for a user who thinks it very troublesome to learn operation procedures, it is presumed that the user can not give priority to its own job and the job is put off by operations of other users, even when a hard copy is needed urgently, resulting in a considerable period of time for which the user must wait.

On the other hand, in the multi-job copying machine of this kind, it is also possible to use an interruption job function to stop the active job by force and to execute the specific job antecedently. However, in the active job, when the specific finishing such as stapling is executed, there is provided a mechanical restriction to prohibit the same finishing for the job of interruption, for preventing confusion.

SUMMARY OF THE INVENTION

In view of the problems in the prior art mentioned above, an object of the invention is to provide an image forming apparatus wherein it is possible to execute easily, on priority basis, the job which requires a hard copy urgently.

To attain the object stated above, the image forming apparatus of the invention has therein an input means for inputting plural jobs relating to image forming, a specifying means which specifies degree of urgency relating to at least a part of the inputted job stated above, a priority order determining means which determines the priority order of the inputted job stated above based on the aforesaid specified degree of urgency, and an execution means which executes the inputted job stated above, based on the determined priority order.

In the image forming apparatus of the invention wherein there are provided an input means for inputting plural jobs relating to image forming, a specifying means which specifies degree of urgency relating to at least a part of the inputted job stated above, a priority order determining means which determines the priority order of the inputted job stated above based on the aforesaid specified degree of urgency, and an execution means which executes the inputted job stated above based on the determined priority order, it is possible even for a user who is inexperienced in the apparatus to execute his own job on priority basis, only by specifying either one of plural urgency steps, for example, because the priority order is determined automatically and the job is executed in accordance with that priority order.

Incidentally, it is preferable that the degree of urgency is graded to be in two or three steps.

Further, if the priority order determining means selects the medium priority order for the job having no specification of degree of urgency when the degree of urgency is graded to be in three steps, or selects the lowest priority order when the degree of urgency is graded to be in two or three steps, it is possible to provide an image forming apparatus which requires less time for a user to input, for example, and is more user-friendly.

When the urgency is the same for all jobs, if the jobs are executed in the order wherein the job having the least number of sheets for image forming comes first, it is possible to reduce the number of reservation jobs in a short period of time, which is convenient.

If there are provided a measuring means which measures waiting time and an alarm device which gives an alarm when a prescribed period of time is measured by the measuring means, with regard to the job postponed in terms of execution due to the input of a new job having high degree of urgency, the attention is called by the alarm even in the case of a job which has not been executed for a long time due to its degree of urgency which is relatively low. Owing to this, a user who wishes to have a hard copy urgently can take necessary actions such as a change of the degree of urgency of the job in a proper manner, which is convenient.

Further, if there are provided a measuring means which measures waiting time and a means for enhancing precedence of a job postponed in terms of execution when a prescribed period of time is measured by the measuring means, with regard to the job postponed in terms of execution due to the input of a new job having high degree of urgency, even in the case of a job which has not been executed for a long time due to its degree of urgency which is relatively low, the priority order of the job can be enhanced automatically by the means stated above, thus the inconvenience that the job is not executed for a long time can be brought under control to the utmost.

In addition, if the image forming apparatus is a copying machine which copies a document, and the specifying means has a means which reads a character or a symbol described on the document, and if an arrangement is made so that degree of urgency for copying the document is specified based on the character or the symbol read by the reading means, it is possible to provide an image forming apparatus which requires no time for a user to input degree of urgency by himself, for example, and is more user-friendly.

BRIEF DESCRIPTION OF THE DRAWINGS

FIG. 1 is a block diagram showing a multi-job copying machine representing an image forming apparatus related to the present embodiment.

Figure 3:
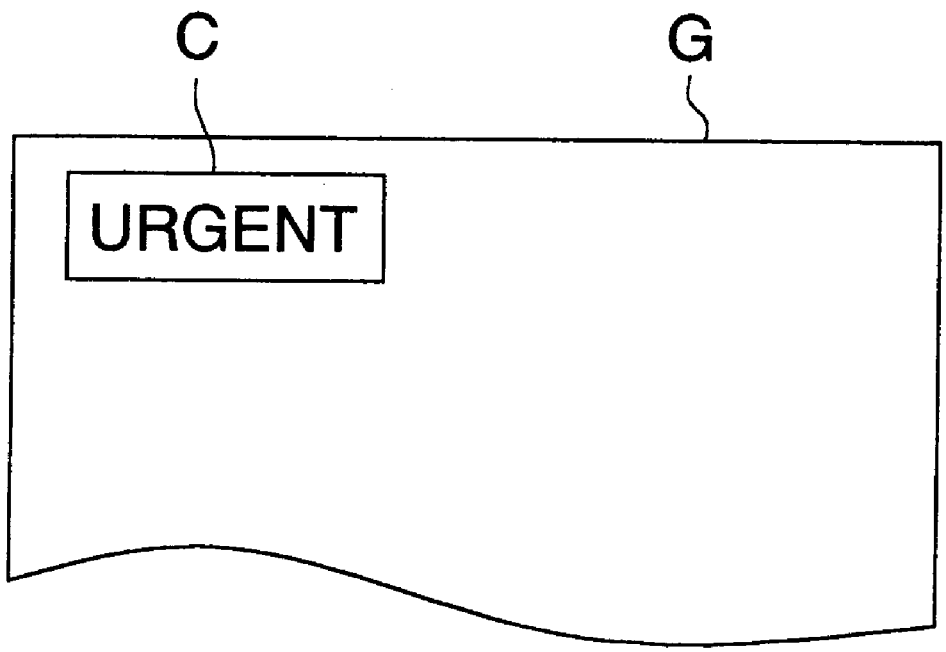

Each of FIGS. 2(a) and 2(b) is a diagram showing a display screen of liquid crystal display 56 related to the present embodiment.

FIG. 3 is a diagram showing an example of a document which is read by a multi-job copying machine in the variation example.

DETAILED DESCRIPTION OF THE PREFERRED EMBODIMENT

An embodiment of the invention will be explained as follows, referring to the drawings. FIG. 1 is a block diagram showing a multi-job copying machine representing an image forming apparatus related to the present embodiment.

In FIG. 1, CPU 1 is connected with scanner 2, memory 3, printer 4, display device 5 and with input means 6 so that they can be controlled by CPU 1. To be more concrete, under the control of CPU 1, scanner 2 serving as an input means reads a document and converts it into digital image data, then, converted digital image data are stored in memory 3, and a hard copy corresponding to a document is made by printer 4 representing an execution means based on the stored digital image data.

Since storage capacity of memory 3 is great in a multi-job copying machine in the present embodiment, a plurality of image data corresponding to the document read can be stored. In this case, there are produced jobs for hard copy in the quantity which is the same as that of documents read. The jobs of this kind attain their objects and are eliminated, or erased from a reservation job list, when hard copies are made by the printer 4.

Further, under the control of CPU 1, display device 5 displays various pieces of information necessary for copying documents, and a user can input information necessary for copying through input means 6 representing a specifying means while observing the aforesaid display. Incidentally, in the present embodiment, a liquid crystal display of a touch type is used, and therefore, the display device 5 and the input means 6 are united integrally.

Each of FIGS. 2(a) and 2(b) is a diagram showing a display screen of liquid crystal display 56 in the present embodiment. As stated above, the multi-job copying machine can read documents continuously through scanner 2 even before hard copies for documents read precedently are completed. FIG. 2(a) is an image screen for the so-called "reservation job" wherein new documents are read through scanner 2 while printer 4 is in process of making hard copies, and thereby, reservation for hard copy is made.

At the center portion in FIG. 2(a), there are provided button group B1 which can display and specify the types of double-sided copy, button group B2 which can display and specify density, button group B3 which can display and specify image quality and button B4 which can display and specify magnification. Since the liquid crystal display 56 is of a touch type as stated above, when a user presses corresponding one in button groups B1–4, display of the pressed button, for example, is reversed to show that the input has been accepted. There are further provided buttons B5 and B6 which can specify degree of urgency and button B7 which requests display of a reservation list, on the right side of the image screen.

Next, operations in the present embodiment will be explained. A user who wishes to make a job reservation presses a proper one of button groups B1–B4 shown on the image screen in FIG. 2(a) after setting a document on scanner 2, and selects a copy mode. Further, the user selects the degree of urgency as occasion demands, by pressing button B5 when he wishes to make copies urgently, or by pressing button B6 when copying is not urgent.

Then, after the user presses an unillustrated start button, CPU 1 makes scanner 2 to read a document, and stores in memory 3 after converting into corresponding digital image data. Incidentally, a copy mode specified by the user through button groups B1–B4 so that the copy mode may correspond to the digital image data stated above, and the degree of urgency specified through buttons B5 or B6 are stored in memory 3.

In this case, a user who wishes to confirm the reservation list presses button B7, upon which the image screen is switched to one shown in FIG. 2(b) which is a diagram showing an image screen indicating the reservation list. In FIG. 2(b), "job number" is assigned automatically in the order of reservation made by a user, "state" shows the current state of the job (namely, in process of execution (RUN) or in process of waiting (WAIT)), "priority" indicates what is specified in accordance with buttons 5 and 6 pressed in the course of making reservation of the job, and "remaining quantity of sheets" shows the number of sheets which have not yet been made to be hard copies in the job.

Due to the state indication shown in FIG. 2(b), it is understood that printer 4 is making hard copies for the job with job number 2 currently, and output is waited for jobs with job numbers 3–6. In this case, CPU 1 representing a priority order determining means determines the execution order of the job whose degree of urgency is "urgent" to be higher in terms of priority order than that of the job whose degree of urgency is "regular", and controls the printer 4 so that it may make hard copies in accordance with the execution order. Therefore, when the job reserved this time is one having the number 6 and when button B5 is pressed in the case of the reservation and "urgent" is specified, its order for waiting is immediately after the last job having the degree of urgency of "urgent" which is after the job number 2 in an example of FIG. 2(b).

Further, with regard to CPU 1, when the degree of urgency is the same for jobs, the execution order is determined so that the job with number 5 having 8 sheets of hard copy may be executed in preference to the job with number 4 having 10 sheets of hard copy so that the priority order of the job having less hard copies may be enhanced. Due to this, the number of reservation jobs can be reduced in a short period of time.

Incidentally, the job with number 6 having 6 sheets of hard copy must have priority over the job with number 2 having 20 sheets of hard copy naturally. However, the job with number 2 was already in process of execution when the reservation for the job with number 6 was made. So, hard copies for the job with number 6 are made after completion of the job with number 2. Namely, there is not carried out the so-called interruption job for executing the job with number 6 precedently after stopping the job with number 2. Accordingly, even in the case where specific finishing such as stapling is conducted in the job with number 20, for example, it does not cause any restriction of functions on the job with number 6.

When many jobs ranked to be "urgent" in terms of degree of urgency are reserved, there is a possibility that the jobs reserved already as "regular" in terms of degree of urgency are lowered relatively in terms of priority order and are sidetracked to wait for a long time until hard copies are made. In that case, it is possible to arrange so that measurement is made by a timer built in CPU 1, and for the job which is not executed even after the lapse of 10 minutes, for example, the corresponding job number flickers on liquid crystal display 56 representing an alarm means to let a user know that execution of the job is delayed.

As a variation thereof to be considered, it is also possible to move up the order of execution for the job which is not executed even after the lapse of 10 minutes by making CPU 1 to change the degree of urgency from "regular" to "urgent" automatically and thereby to enhance the priority order. Incidentally, the waiting time which is responded by CPU 1 is not limited to 10 minutes, and it may be either longer or shorter than that, or it may be changed by a user freely.

Since printer 4 can be connected with external printer controller 7 as shown with dotted lines in FIG. 1, it is also considered to conduct hard copy work based on image data inputted from the printer controller 7. In that case, CPU 1 treats a job to conduct hard copy work based on image data coming from a print controller as one whose degree of urgency is specified to be "regular". The reason of the foregoing is that hard copies based on image data from external print controller 7 are used privately in many cases, and their degree of urgency is considered to be relatively lower, compared with copying which is conducted to make many materials to be distributed.

In the embodiment stated above, a user is supposed to specify the degree of urgency either of "urgent" or "regular". However, if an arrangement is made so that the degree of urgency of a job is "regular" unless a button is pressed as default, and the degree of urgency is specified as "urgent" only when "urgent" specification button B5 is pressed, time for inputting is reduced, resulting in further convenience. Incidentally, it is also possible to make an arrangement so that the degree of priority can be changed later with regard to the job waiting for execution.

On the contrary, in another variation, the degree of urgency can be inputted automatically. FIG. 3 is a diagram showing an example of a document which is read by a multi-job copying machine in the present variation example.

In FIG. 3, character C of "urgent" is marked on the upper left of document G. CPU 1 has OCR functions, and when digital image data from scanner 2 which has read document G are analyzed, and when character C of "urgent" is judged to be present on the upper left, the degree of urgency of the job for the hard copy is treated to be specified as "urgent". On the other hand, when character C of "urgent" is judged not to be present on the upper left, the degree of urgency of the job for the hard copy is treated by CPU 1 to be specified as "regular". Further, CPU 1 determines the priority order based on its degree of urgency in the same way as in the aforesaid embodiment, and controls the order of execution for hard copies.

As in the foregoing, in the variation stated above, the degree of urgency is established automatically depending on whether or not a character of "urgent" is marked on the upper left of a document through a word processor or a rubber stamp (handwriting is acceptable according to circumstances), even when a user does not input information of degree of urgency in a multi-job copying machine. Therefore, even a person who is inexperienced in such multi-job copying machine can give priority easily to its own job. Incidentally, the degree of urgency to be marked on a document may also be expressed not only by characters but also by alphanumeric characters and symbols.

Though the invention has been explained as in the foregoing, referring to the embodiment, the invention should not be construed to be limited to the embodiment, but it can naturally be changed or improved. For example, in the embodiment stated above, the degree of urgency can be specified into two steps. However, it is also possible to specify into three steps of "urgent", "regular" and "background" in the order wherein the highest degree of urgency comes first. In this case, when default of the degree of urgency specified by force when a user does not input the degree of urgency is made to be "regular", it is not necessary to input the degree of urgency for the job of "regular" considered to be of the highest frequency in use, and time for inputting can be saved in total.

On the other hand, a person who wishes urgent copying specifies "urgent", while, a person who wishes copies in a large amount that are not so urgent has only to specify "background", and thereby, the jobs can be scheduled efficiently. However, default of degree of urgency can also be made to be "background".

Since the image forming apparatus of the invention has therein an input means which inputs plural jobs relating to image forming, a specifying means which specifies degree of urgency with regard to at least a part of the job inputted, a priority order determining means which determines priority order of the job inputted based on the degree of urgency specified, and an execution means which executes the job inputted based on the priority order determined, the priority order can be determined automatically when a user just specifies either one of plural steps of degree of urgency, and the job is executed in accordance with the priority order, which therefore makes it possible that even a user who is inexperienced in the apparatus can execute its own job on priority basis.

What is claimed is:

1. An image forming apparatus comprising:
    (a) an input means for inputting plural jobs relating to image forming;
    (b) a specifying means for specifying degree of urgency relating to at least a part of the job inputted by the input means;
    (c) a priority order determining means for determining a priority order of the job based on the degree of urgency specified by the specifying means; and
    (d) an execution means for executing the job based on the priority order determined by the priority order determining means.

2. The image forming apparatus of claim 1, wherein the degree of urgency is graded to be in two steps.

3. The image forming apparatus of claim 1, wherein the degree of urgency is graded to be in three steps.

4. The image forming apparatus of claim 3, wherein the priority order determining means selects a medium priority order for a job having no specification of degree of urgency.

5. The image forming apparatus of claim 3, wherein the priority order determining means selects a lowest priority order for a job having no specification of degree of urgency.

6. The image forming apparatus of claim 1, wherein when the degree of urgency is the same for all jobs, the jobs are executed in order wherein a job having a least number of sheets for image forming comes first.

7. The image forming apparatus of claim 1, further comprising:
- a measuring means for measuring waiting time with regard to execution of a job postponed due to an input of a new job having high degree of urgency; and
- an alarm device for giving an alarm when a prescribed period of time is measured by the measuring means.

8. The image forming apparatus of claim 1, further comprising:
- a measuring means for measuring waiting time with regard to execution of the job postponed due to an input of a new job having high degree of urgency; and
- a means for enhancing priority of execution of a job postponed when a prescribed period of time is measured by the measuring means.

9. The image forming apparatus of claim 1, wherein the image forming apparatus is a copying machine which copies a document, and wherein the specifying means comprises a means for reading a character or a symbol described on the document, and specifies degree of urgency for copying the document based on the character or the symbol read by the reading means.

* * * * *